(12) United States Patent
Bender et al.

(10) Patent No.: US 7,899,498 B2
(45) Date of Patent: Mar. 1, 2011

(54) METHOD AND SYSTEM FOR RECOGNITION OF INCOMING CALLS TO A VOICEMAIL SYSTEM

(75) Inventors: Maureen Bender, Cedar Park, TX (US); Paul R. McLaughlin, Round Rock, TX (US)

(73) Assignee: AT&T Intellectual Property I, LP, Reno, NV (US)

(*) Notice: Subject to any disclaimer, the term of this patent is extended or adjusted under 35 U.S.C. 154(b) by 515 days.

(21) Appl. No.: 11/733,268

(22) Filed: Apr. 10, 2007

(65) Prior Publication Data

US 2008/0254772 A1    Oct. 16, 2008

(51) Int. Cl.
*H04M 1/00* (2006.01)
*H04B 1/38* (2006.01)

(52) U.S. Cl. ........ 455/564; 455/41.1; 455/41.2; 455/410; 455/411; 455/413; 455/420; 455/556.1; 455/558; 455/565; 340/572.1; 340/572.3; 340/572.4

(58) Field of Classification Search ........ 455/41.1–41.2, 455/410–411, 412.1–412.2, 414.1–414.4, 455/413, 415–420, 556.1–556.2, 557, 569.1–569.2, 455/558, 564, 565; 340/572.1, 572.3, 572.4, 340/572.8

See application file for complete search history.

(56) References Cited

U.S. PATENT DOCUMENTS

| 5,450,488 | A | 9/1995 | Pugaczewski et al. |
|---|---|---|---|
| 5,768,356 | A | 6/1998 | McKendry et al. |
| 6,483,899 | B2 | 11/2002 | Agraharam et al. |
| 6,614,887 | B1 | 9/2003 | Satapathy et al. |
| 6,850,147 | B2 | 2/2005 | Prokoski et al. |
| 6,868,142 | B2 | 3/2005 | Gupta et al. |
| 6,928,149 | B1 | 8/2005 | Panjwani et al. |
| 7,107,220 | B2 | 9/2006 | Novack et al. |
| 7,406,323 | B2 * | 7/2008 | Ayatsuka et al. ............. 455/461 |
| 2005/0135383 | A1 | 6/2005 | Shenefiel |
| 2005/0233733 | A1 | 10/2005 | Roundtree |
| 2007/0008130 | A1 * | 1/2007 | Ashwood Smith ........ 340/572.1 |
| 2007/0037605 | A1 | 2/2007 | Logan |

* cited by examiner

*Primary Examiner* — Tuan A Tran
(74) *Attorney, Agent, or Firm* — Larson Newman & Abel, LLP

(57) ABSTRACT

A system and method for recognition of incoming call to a voicemail system is disclosed. A radio frequency identification (RFID) authenticates a user of a mobile communication device. The mobile communication device enables a one-button dialing of a voicemail system based on the RFID signal. The voicemail system recognizes the incoming call as the owner of the voicemail system and presents a plurality of options for accessing the voicemail system without playing the outgoing message.

20 Claims, 4 Drawing Sheets

METHOD AND SYSTEM FOR RECOGNITION OF INCOMING CALLS TO A VOICEMAIL SYSTEM

FIELD OF THE DISCLOSURE

The present disclosure generally relates to voicemail systems, and more particularly relates to recognition of incoming calls to a voicemail system.

BACKGROUND

Conventional voicemail systems require an individual to wait all the way through a recorded greeting before leaving a message. Such systems may allow the owner of the mailbox to interrupt the greeting, and then enter a personal identification number (PIN) to access any messages in the mailbox. Some cellular telephones allow easier access to a voice mailbox by providing a certain button that, when depressed and held, directly accesses the voice mailbox associated with the telephone number of the cellular telephone.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE DRAWINGS

A voicemail system is disclosed that has a number of security features to ensure that the person accessing the voicemail system is authorized to do so. A mobile communication device has the telephone number of the voicemail system stored in memory to allow one-button dialing to the voicemail system. Before the one-button dialing is enabled on the mobile communication device, an authentication signal from a radio frequency identification (RFID) device is received by the mobile communication device to indicate that the owner is near the mobile communication device. The RFID device is used to make the one-button dialing of the voicemail system available only to the owner of the mobile communication device or someone to whom the owner has given the RFID device. When the voicemail system receives an incoming call, and the voicemail system recognizes the telephone number of the incoming call, such as from the mobile communication device, the voicemail system handles the call differently than a normal incoming call. During a normal incoming call to the voicemail system, a recorded message is played and the voicemail system records any voicemail left by the caller. However, when the incoming telephone number is recognized, such as the telephone number of the mobile communication device, the voicemail system presents the caller with the option to enter the mailbox directly, or to leave a voicemail without listening to the owner's recorded greeting.

Figure 1:
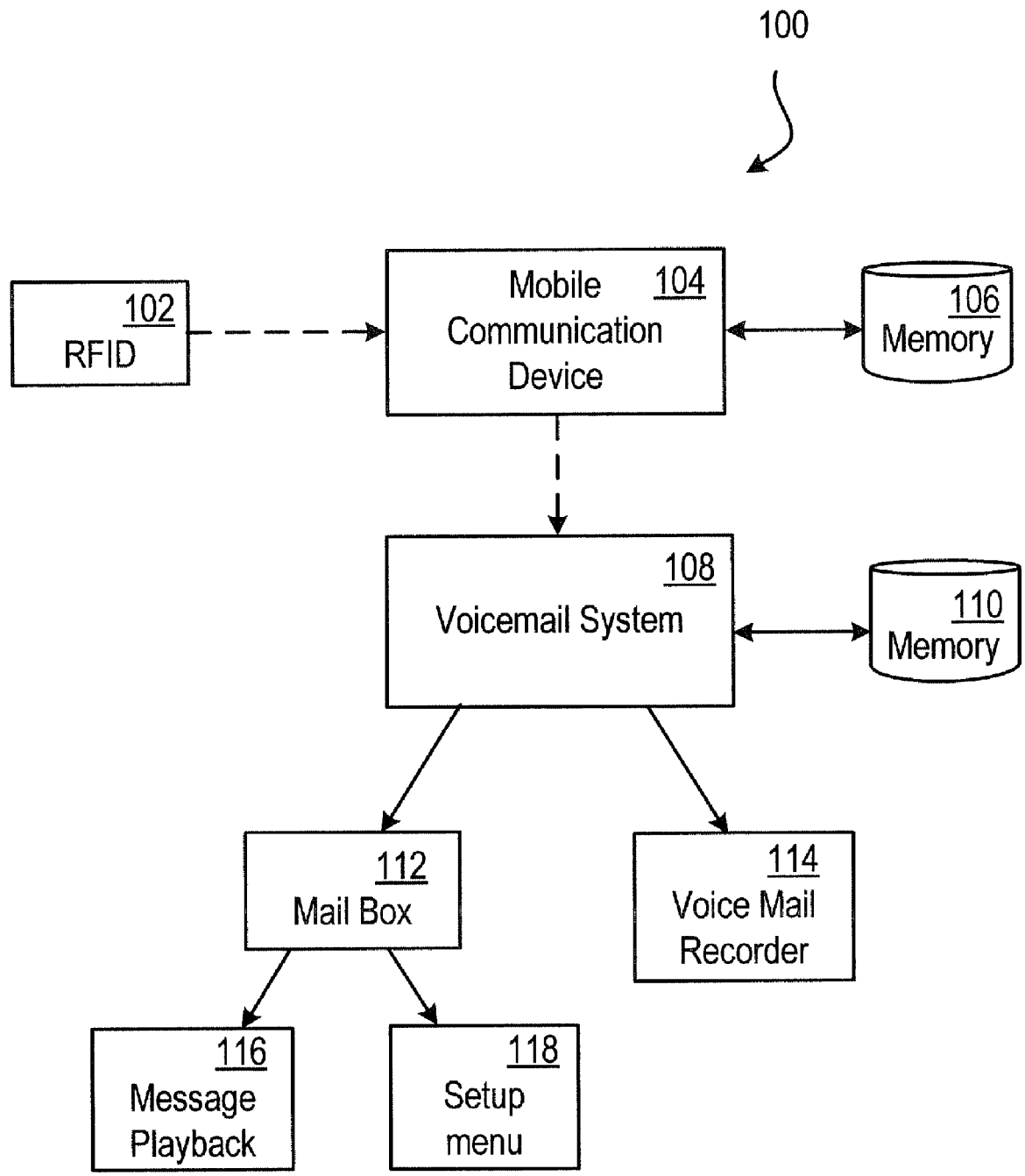
FIG. 1 is a block diagram of an embodiment of a system for accessing a voicemail system.

FIG. 1 shows a system 100 for accessing a voicemail service. The system 100 includes a radio frequency identification (RFID) device 102, a mobile communication device 104, a mobile communication memory 106, and a voicemail service 108. The voicemail service 108 includes a voicemail memory 110, a mailbox 112, and a voicemail recorder 114. The mailbox 112 has a message playback device 116 and a setup menu 118.

The mobile communication device 104 is preferably a cellular telephone, or any other portable device, which has a telephone number associated with it. The mobile communication device 104 has a one-button dialing feature for calling the voicemail service 108, where pressing and holding only one-button on the mobile communication device dials a telephone number for the voicemail system. In one embodiment, the voicemail service 108 and the mobile communication device 104 have the same telephone number, such that the voicemail system records messages left for the mobile communication device. In another embodiment, the voicemail service 108 and the mobile communication device 104 have different telephone numbers such that the voicemail system records messages left for a telephone number that is not related to the mobile communication device. In the latter situation, the telephone number of the voicemail system is stored in the mobile communication memory 106, such as a telephone book feature found in conventional cellular telephones.

The one-button dialing of the present invention is not enabled unless the mobile communication device 104 senses an authentication signal broadcast by the RFID device 102. The owner of the mobile communication device 104 has the RFID device 102 that sends a signal to the mobile communication device 104 indicating that the owner is nearby. The RFID device 102 is anything that an individual normally carries, such as jewelry (e.g. watch, bracelet, wristband, necklace, or ring), a pen, or a card that fits easily in a wallet or purse. The owner of the mobile communication device 104 controls who has access to the voicemail system by only allowing a person with the RFID device 102 to have access to the one-button dialing feature for accessing the voicemail service 108. This allows protection for the owner of the mobile communication device 104 and the voicemail service 108 because a person that uses the mobile communication device without the RFID device 102 is required to know the actual number of the voicemail system. The mobile communication memory 106 verifies the authentication signal sent from the RFID device 102 to the mobile communication device 104 before enabling the one-button dialing feature.

As the voicemail service 108 receives an incoming call, such as from the mobile communication device 104, the telephone number of the incoming call is compared to a list of telephone numbers created in the voicemail memory 110 during the setup of the voicemail system. Recognition of the telephone number of the incoming call by the voicemail service 108 verifies that the person calling is the owner of the voicemail system. The voicemail service 108 presents the owner with the option to enter directly into the mailbox 112 or to leave a voicemail with the voicemail recorder 114. Additionally, the voicemail service 108 presents the owner with the option of listening to recorded messages from the message playback device 116 or selecting to enter the setup menu 118. The setup menu 118 provides a plurality of additional options to the owner for navigating through the voicemail service 108.

Figure 2:
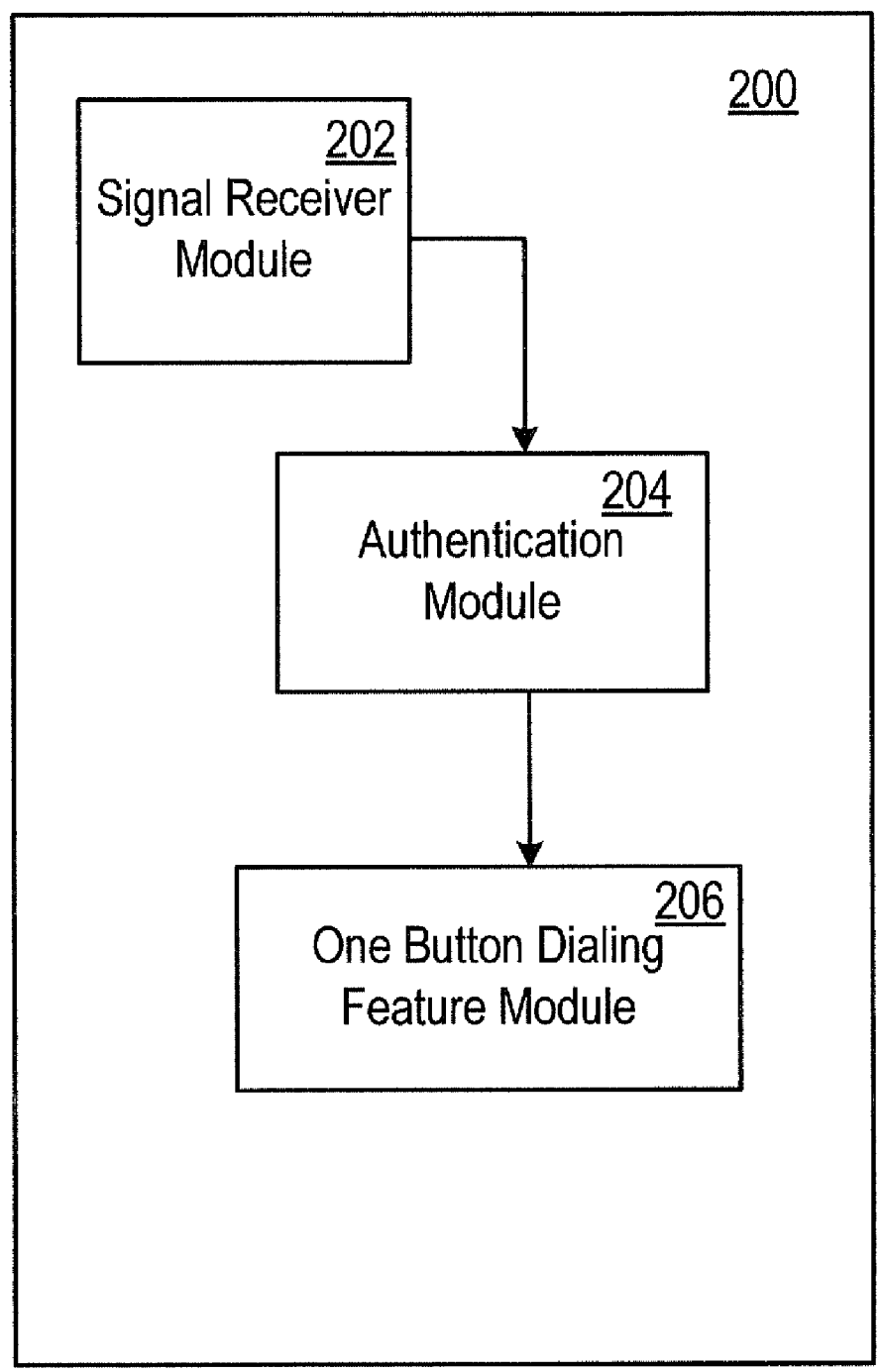
FIG. 2 is a block diagram of an embodiment of a mobile communication device.

FIG. 2 shows an embodiment of a mobile communication device 200. The mobile communication device 200 includes a signal receiver module 202, a memory module 204 and a one-button dialing feature module 206. The mobile communication device 200 enables access to a voicemail system upon authentication by a radio identification device, such as the RFID device 102 from FIG. 1. The signal receiver module 202 receives identification signals from RFID devices, and sends the identification signals to the memory module 204. Any identification signal received by the signal receiver module 202 is sent to the memory module 204 for verification that the identification signal is associated with a user of the mobile communication device 200. In one embodiment, the memory module 204 only has one identification signal stored to verify a user of the mobile communication device 200. In another embodiment, the memory module 204 is a database containing a plurality of valid identification signals for a plurality of users. The database of identification signals allows the memory module 204 to authenticate multiple users without the users having to use the same RFID device.

For example, a husband and wife each have a different RFID device for the mobile communication device 200, allowing him or her access to the one-button dialing feature of the mobile communication device 200. The husband and wife each use the mobile communication device 200 to access a different voicemail system based on his or her RFID device. The memory module 204 enables the one-button dialing feature module 206 upon verification of the identification signal sent from the signal receiver module 202. The one-button dialing feature module 206 enables access to a different voicemail system based on the identification signal verified by the memory module 204. In the example above, the husband's RFID device has an identification signal that the memory module 204 associates with the husband, and the memory module then enables the one-button dialing feature module 206 to allow one-button dialing of the husband's voicemail system. Additionally, the wife's RFID device has an identification signal that the memory module 204 associates with the wife, and the memory module then enables the one-button dialing feature module 206 to allow one-button dialing of the wife's voicemail system. Therefore, depending on the identification signal received by the signal receiver module 202, the memory module 204 and the one-button dialing feature module 206 enable access to a plurality of voicemail systems.

Figure 3:
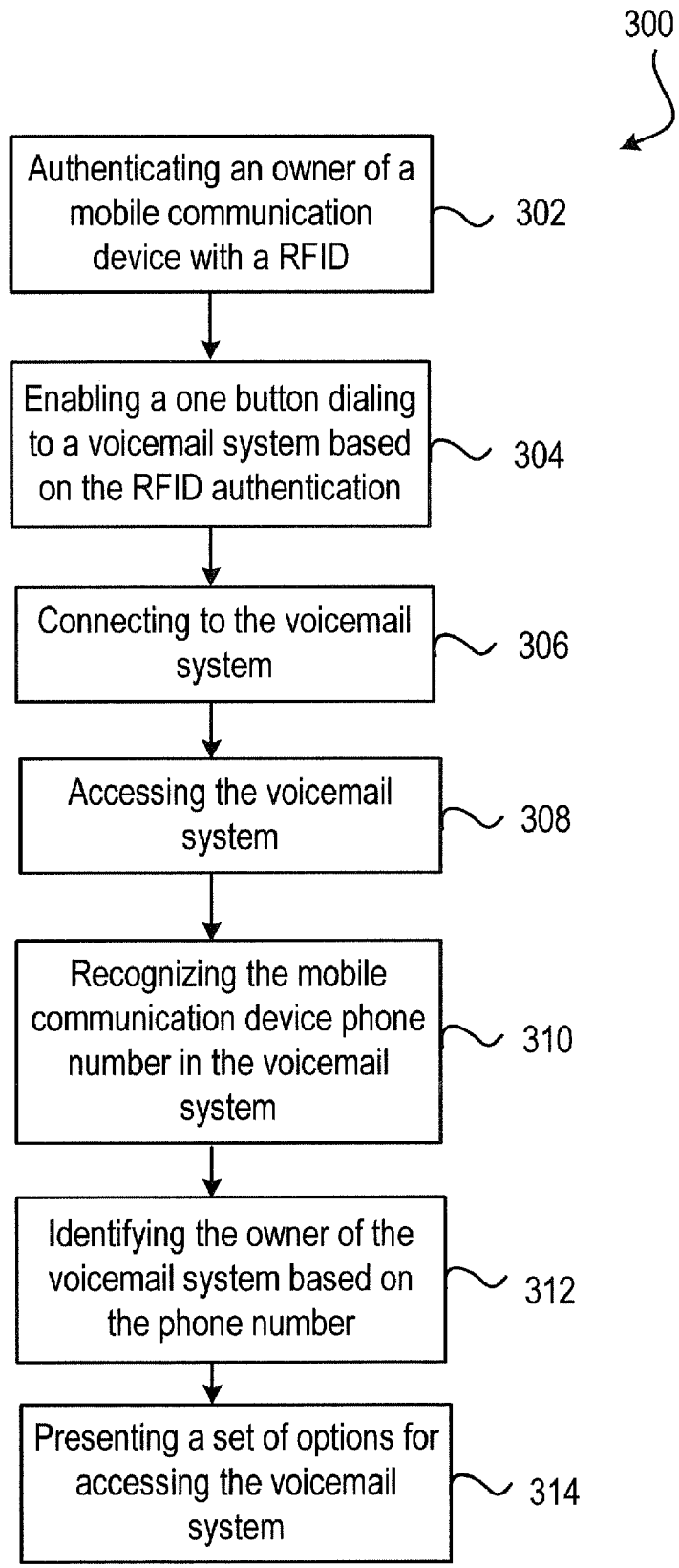
FIG. 3 is a flow chart of an embodiment of a method for accessing the voicemail system.

FIG. 3 shows a flow chart of a method for accessing a voicemail system 300. In step 302, an individual has a RFID with him or her to authenticate him or her as the owner of a mobile communication device. The mobile communication device receives the authentication signal from the RFID and enables a one-button dialing of a voicemail system feature on the mobile communication device in step 304. In step 306, the owner of the mobile communication device pushes and holds the button, and thereby the mobile communication device dials and connects with the voicemail system. The mobile communication device accesses the voicemail system in step 308. In step 310, the voicemail system recognizes the telephone number of the communication device, by comparing the telephone number to a list of telephone numbers saved in the voicemail system. The voicemail system identifies that the user of the mobile communication device is the owner of the voicemail system by recognizing the telephone number as being on the list of telephone numbers in the voicemail system in step 312. In step 314, the voicemail system presents the owner a set of options for accessing the voicemail system.

Figure 4:
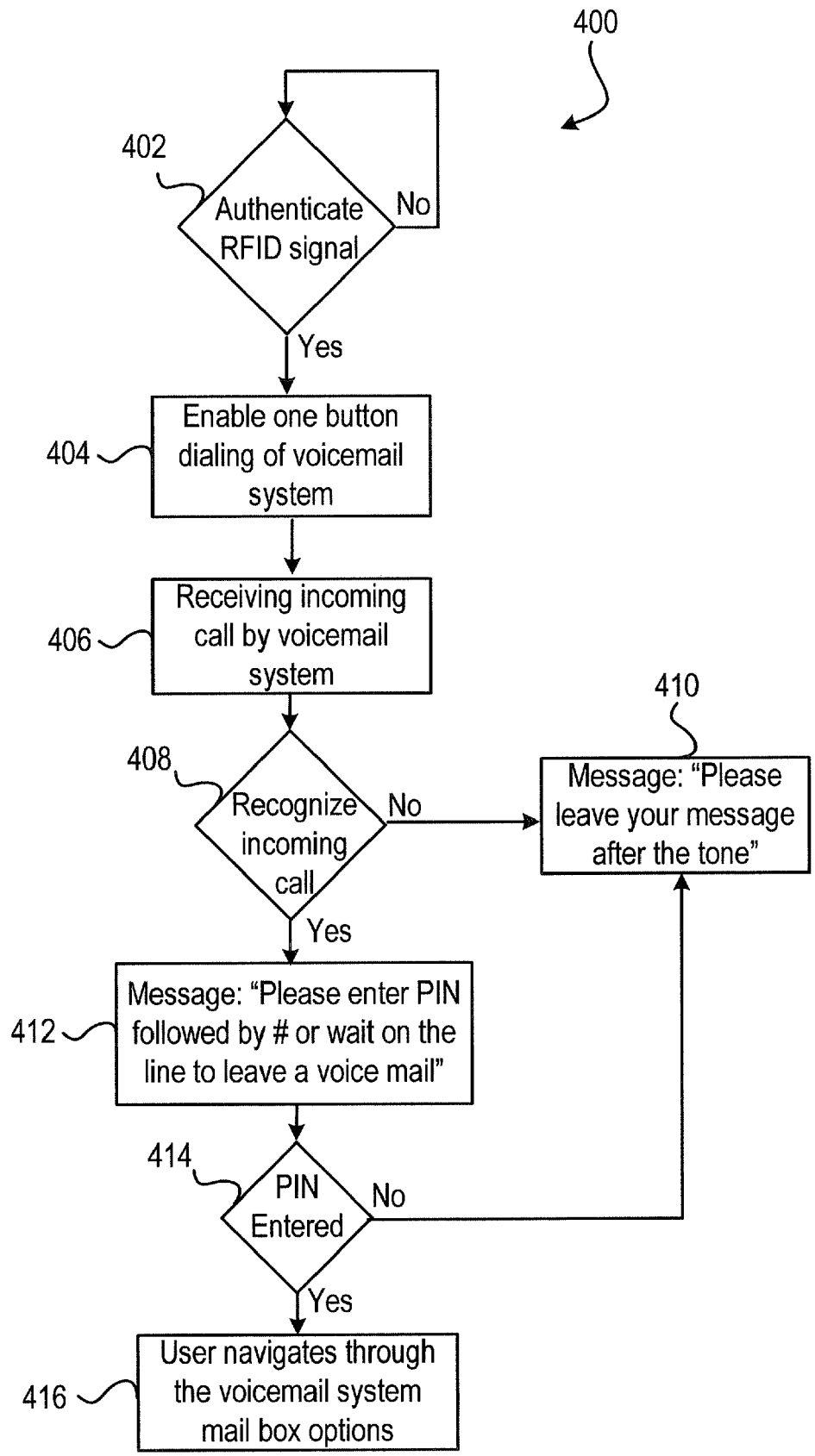
FIG. 4 is a flow chart of an alternative embodiment of the method for accessing the voicemail system.

FIG. 4 shows a flow chart of an alternative method for authenticating a user of a voicemail system 400. In an exemplary embodiment the voicemail system uses an authentication signal from a RFID device and an additional feature, entering a PIN, to ensure the security of the voicemail system. In this embodiment the RFID device authenticates a user of a mobile communication device, however the owner of the voicemail system has to additionally enter a PIN before gaining access to the voicemail system. In step 402, a mobile communication device waits for an authentication signal from the RFID, indicating that a user of the mobile communication device is the owner. The mobile communication device enables one-button dialing to a voicemail system when the RFID is within a specific range of the mobile communication device as indicated in step 404. The voicemail system receives the incoming call from the mobile communication device in step 406. In step 408, the voicemail system determines if the incoming call is from a recognized number located in a database of the voicemail system. In step 410, if the telephone number is not recognized, then the voicemail system plays a recorded message such as "Please leave your message at the tone," and the caller has the option of leaving a voicemail for the owner of the voicemail system. If the voicemail system recognizes the telephone number of the incoming call, such as the telephone number of the mobile communication device, the voicemail system plays a message such as "Please enter your PIN number followed by the pound key to enter the voice mailbox for 'the Smith Family' or hold on the line and you may leave a voicemail," in step 412. In step 414, the voicemail system waits for the PIN and pound key to be entered. If no PIN is entered, the voicemail system plays the outgoing message for leaving a voicemail as stated in step 410 above, because the caller is determined not to be the owner of the voicemail system. However, if the PIN and pound key are entered, the voicemail system gives the caller a set of options for navigating through the mailbox of the voicemail system in step 416. The options available to the owner of the voicemail system are to listen to messages left in the voicemail system, to leave a voicemail message without having to hear the outgoing message, or setup options for the voicemail system.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for accessing a voicemail service, the system comprising:
   a radio frequency identification (RFID) device configured to provide an identification signal, wherein the RFID device does not include a battery; and
   a mobile communication device separate from the RFID device and configured to enable one-button dialing of the voicemail service upon authentication of a first user of the mobile communication device, the authentication comprising determining that the identification signal is associated with the first user, and wherein the voicemail service is identified by a phone number that is not provided by the RFID device.

2. The system of claim 1 wherein the mobile communication device has a first telephone number and the voicemail service has a second telephone number.

3. The system of claim 1 wherein the voicemail service presents the first user of the mobile communication device with a set of options for access to the voicemail service.

4. The system of claim 3 wherein a first option for access to the voicemail service includes leaving a voice message without first receiving an outgoing message from the voicemail service.

5. The system of claim 4 wherein a second option for access to the voicemail service includes entering a mailbox directly.

6. The system of claim 5 wherein a third option for access to the voicemail service includes listening to voice messages in the mailbox of the voicemail service.

7. The system of claim 6 wherein a fourth option for access to the voicemail service includes accessing a setup menu for the mailbox of the voicemail service.

8. The system of claim 1 further comprising authentication of a second user of the mobile communication device based on determining that the identification signal is associated with the second user.

9. A method comprising:
   authenticating a user of a mobile communication device based on an identification signal received from a radio frequency identification (RFID) device located in proximity and external to the mobile communication device, wherein the RFID device does not include a battery; and
   enabling a one-button dialing feature at the mobile communication device, the one-button dialing feature configured to initiate a call to a voicemail system associated with the user, wherein the voicemail system is identified by a phone number stored at the mobile communication device prior to the authenticating, and wherein the phone number is not provided by the RFID device.

10. The method of claim 9 further comprising:
    recognizing a telephone number of the mobile communication device by the voicemail system;
    identifying an owner of the voicemail system based on the recognition of the telephone number of the mobile communication device; and
    presenting a set of options after the voicemail system recognizes the telephone number of the mobile communication device.

11. The method of claim 10 wherein a first option for accessing the voicemail system is directly leaving a voicemail without first hearing an outgoing message from the voicemail service.

12. The method of claim 11 wherein a second option for accessing the voicemail system is to enter a mailbox directly.

13. The method of claim 12 wherein a third option for accessing the voicemail system is to hear a set of messages left in the mailbox.

14. The method of claim 13 wherein a fourth option for accessing the voicemail system is to access a setup menu for the mailbox.

15. The method of claim 9 wherein the mobile communication device has a first telephone number and the voicemail system has a second telephone number.

16. A mobile communication device comprising:
    a signal receiver module configured to receive an identification signal from a radio frequency identification (RFID) device located in proximity and external to the mobile communications device, wherein the RFID device does not include a battery;
    a memory module configured to verify that the identification signal is associated with a first user of the mobile communication device; and
    a one-button dialing feature module configured to access a first voicemail system in response to the verifying, wherein the first voicemail service is identified by a phone number stored at the mobile communication device prior to the verifying, and wherein the phone number is not provided by the RFID device.

17. The mobile communication device of claim 16 wherein the memory module includes a database to verify that the identification signal is associated with a second user of the mobile communication device.

18. The mobile communication device of claim 17 wherein the one-button dialing feature module connects with a second voicemail system in response to determining that the identification signal is associated with the second user.

19. The mobile communication device of claim 18 wherein the memory module enables the one-button dialing feature module to connect to the second voicemail system.

20. The mobile communication device of claim 19 wherein a telephone number of the second voicemail system is different from a telephone number of the first voicemail system.

* * * * *